(12) United States Patent
Zhao (10) Patent No.: US 9,775,064 B2
(45) Date of Patent: Sep. 26, 2017

(54) BUFFER STATE REPORTING METHOD, SYSTEM, AND DEVICE

(71) Applicant: China Academy of Telecommunications Technology, Beijing (CN)

(72) Inventor: Yali Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 159 days.

(21) Appl. No.: 14/405,401

(22) PCT Filed: Jun. 4, 2013

(86) PCT No.: PCT/CN2013/076704
§ 371 (c)(1),
(2) Date: Dec. 4, 2014

(87) PCT Pub. No.: WO2013/182035
PCT Pub. Date: Dec. 12, 2013

(65) Prior Publication Data
US 2015/0110040 A1    Apr. 23, 2015

(30) Foreign Application Priority Data

Jun. 4, 2012   (CN) .......................... 2012 1 0181298

(51) Int. Cl.
*H04W 24/10* (2009.01)
*H04W 72/12* (2009.01)

(52) U.S. Cl.
CPC ....... *H04W 24/10* (2013.01); *H04W 72/1252* (2013.01); *H04W 72/1268* (2013.01); *H04W 72/1284* (2013.01)

(58) Field of Classification Search
CPC ............. H04W 24/10; H04W 72/1252; H04W 72/1268; H04W 72/1284
(Continued)

(56) References Cited

U.S. PATENT DOCUMENTS

2010/0110895 A1* 5/2010 Wu ....................... H04W 28/06
370/241
2010/0273515 A1* 10/2010 Fabien .................... H04L 5/006
455/509

(Continued)

FOREIGN PATENT DOCUMENTS

CN      101541099 A      9/2009
CN      101835191 A      9/2010
(Continued)

OTHER PUBLICATIONS

3GPP, 3rd Generation Partnership Project; Technical Specification Gro up Radio Access Network; Evolved Universal Terrestrial Radio Access (EUTRA); Medium Access Control (MAC) protocol specification (Release 10) , 3GPP TS 36.321 V10.5.0 (Mar. 2012), p. 1, 26-28.
(Continued)

*Primary Examiner* — Andrew Chriss
*Assistant Examiner* — Ellen Kirillova
(74) *Attorney, Agent, or Firm* — Kilpatrick Townsend & Stockton LLP (57) ABSTRACT

Embodiments of the present invention relate to the technical field of wireless communications, and more particularly to a buffer state reporting method, system, and device, so as to perform buffer state reporting regarding an inter-eNB aggregation scenario. A buffer state reporting method provided by an embodiment of the present invention comprises: a user equipment, that aggregates resources of multiple network side devices, determining buffer state information; the user side devices, determining buffer state information; the user (Continued)

equipment reporting the buffer state information to at least one network side device participating in the aggregation, so as to realize buffer state reporting regarding the inter-eNB aggregation scenario, and enable multiple eNBs to obtain the buffer state information in the case of inter-eNB aggregation, thereby realizing resource scheduling.

17 Claims, 2 Drawing Sheets

(58) Field of Classification Search
USPC ......................................................... 370/329
See application file for complete search history.

(56) References Cited

U.S. PATENT DOCUMENTS

| 2012/0099452 A1* | 4/2012 | Dai | H04W 72/1221 |
| | | | 370/252 |
| 2015/0009923 A1* | 1/2015 | Lei | H04W 72/0413 |
| | | | 370/329 |

FOREIGN PATENT DOCUMENTS

| CN | 101925128 A | 12/2010 |
| CN | 101932019 A | 12/2010 |
| CN | 102111751 A | 6/2011 |
| CN | 102291760 A | 12/2011 |
| CN | 102364984 A | 2/2012 |
| EP | 2398274 A1 | 12/2011 |
| JP | 2011142638 A | 7/2011 |
| WO | 2011/0100492 A1 | 8/2011 |
| WO | 2011159102 A2 | 12/2011 |

OTHER PUBLICATIONS

The Office Action issued on Nov. 16, 2015 in the JP counterpart application (2015-515380).
LTE; Evolved Universal Terrestrial Radio Access (E-UTRA); Medium Access Control (MAC) protocol specification (3GPP TS 36.321 version 10.5.0 Release 10), 56 pages.
International Search Report for PCT/CN2013/076704.
3GPP TS 36.321 V10.5.0, 3rd Generation Partnership Project; Technical Specification Group Radio Access Network; Evolved Universal Terrestrial Radio Access (E-UTRA); Medium Access Control (MAC), Protocol Specification (Release 1 0), http:www.3gpp.org, Mar. 31, 2012 (Mar. 31, 2012).
Nokia Siemens Networks, Nokia Corporation: "BSR for Carrier Aggregation (R2-102805)", 3GPPTSG-RAN WG2 Meeting #70, May 10-14, 2010 (May 14, 2010), pp. 1-2.
Nokia Siemens Networks, Nokia Corporation: "Inter-eNB Communication for IDC (R2-120058)", 3GPPTSG-RAN WG2 Meeting #77, Feb. 6-10, 2012 (Feb. 10, 2012), pp. 1-2.
The Office Action issued on Oct. 10, 2015 in the CN counterpart application (201210181298.1).

* cited by examiner

BUFFER STATE REPORTING METHOD, SYSTEM, AND DEVICE

This application is a US National Stage of International Application No. PCT/CN2013/076704, filed on Jun. 4, 2013, designating the United States and claiming the priority of Chinese Patent Application No. 201210181298.1, filed with the Chinese Patent Office on Jun. 4, 2012 and entitled "Method of and system and device for reporting a buffer state", the content of which is hereby incorporated by reference in its entirety.

FIELD

The present invention relates to the technical field of wireless communications and particularly to a method of and system and device for reporting a buffer state.

BACKGROUND

There are significantly improved required peak rates of a Long Term Evolution-Advanced, LTE-A, system up to 1 Gbps in the downlink and 500 Mbps in the uplink as compared with an LTE system. The LTE-A system is also required to be well compatible with the LTE system. Carrier Aggregation, CA, has been introduced to the LTE-A system in view of the required improved peak rates, compatibility with the LTE system and full use of spectrum resources.

With carrier aggregation, a user equipment can operate concurrently over a plurality of cells, where these cells can be consecutive or inconsecutive in frequency, and bandwidths of the respective cells may be the same or different. There is a limited bandwidth up to 20 MHz of each cell for compatibility with the LTE system. The number of cells that can be aggregated for the user equipment is typically up to 5 at present.

In the carrier aggregation system, all of cells configured by a eNB for the user equipment can be referred to as serving cells, but all the functions of the different cells may not be the same, so the serving cells are further categorized in the LTE-A system as follows:

A Primary Cell, PCell, where only one of the plurality of cells aggregated for the user equipment is defined as a Pcell, which is selected by the eNB and configured to the user equipment by Radio Resource Control, RRC, signaling. A Physical Uplink Control Channel, PUCCH, is configured only over the PCell; and A Secondary Cell, SCell, where all the other cells than the PCell aggregated for the user equipment are SCells.

With the concept of carrier aggregation in the Release 10, R10/Release 11, R11, only the cells served by the same eNB can be allowed to be aggregated for a User Equipment, UE, that is, intra-eNB (intra-eNB) aggregation.

Both the LTE and LTE-A systems are scheduling-based systems, where the eNB allocates time and frequency resources to the UE for data transmission, and the user equipment receives downlink data or transmits uplink data according to a scheduling command of the eNB.

Uplink data transmission is scheduled by the eNB, where a scheduler of the eNB notifies the user equipment of an uplink resource by an uplink, UL, grant after determining the allocation of the uplink resource. The scheduler of the eNB allocates the uplink resource in accordance with the amount of uplink data to be transmitted by the UE, i.e., a buffer state of the UE. The buffer is at the UE side, and the UE needs to make a Buffer State Report, BSR, to the eNB so that the eNB has knowledge of the state.

As described above, carrier aggregation prior to the Release 11, R11, refers to aggregation of cells served by the same eNB, i.e., intra-eNB aggregation. The Release 12, R12, may have inter-eNB aggregation introduced thereto. Inter-eNB aggregation has the following two modes:

In a mode 1, the same RB of the same UE is transmitted by different eNBs.

In a mode 2, different RBs of the same UE are transmitted by different eNBs.

For the UE of the R11 and earlier releases, a BSR, is made based upon the size of a buffer of each logic channel group reported by the UE, but if inter-eNB aggregation is introduced to the R12, then two eNBs can perform uplink scheduling respectively, and apparently the existing BSR scheme is not applicable to the scenario of inter-eNB aggregation.

In summary, there has been absent so far a solution to making a buffer state report in the scenario of inter-eNB aggregation.

SUMMARY

Embodiments of the invention provide a BSR solution so as to make a buffer state report in the scenario of inter-eNB aggregation.

A method of reporting a buffer state provided by an embodiment of the invention includes:

determining, by a user equipment for which resources of a plurality of network side devices are aggregated, buffer state information; and reporting, by the user equipment, the buffer state information to at least one of the network side devices participating in aggregation.

Another method of reporting a buffer state provided by an embodiment of the invention includes:

receiving, by a network side device, buffer state information from a user equipment for which resources of a plurality of network side devices are aggregated; and performing, by the network side device, scheduling according to the buffer state information.

A user equipment for reporting a buffer state provided by an embodiment of the invention includes:

a determining module configured to determine buffer state information after resources of a plurality of network side devices are aggregated for the user equipment; and a reporting module configured to report the buffer state information to at least one of the network side devices participating in aggregation.

A network side device for reporting a buffer state provided by an embodiment of the invention includes:

a receiving module configured to receive buffer state information from a user equipment for which resources of a plurality of network side devices are aggregated; and a processing module configured to perform scheduling according to the buffer state information.

An embodiment of the invention provides a system for reporting a buffer state, the system device includes:

a user equipment, for which resources of a plurality of network side devices are aggregated, configured to determine buffer state information and to report the buffer state information to at least one of the network side devices participating in aggregation; and the network side devices configured to receive the buffer state information from the user equipment for which the resources of the plurality of network side devices are aggregated and to perform scheduling according to the buffer state information.

Another network side device provided by an embodiment of the invention includes:

a receiver configured to receive buffer state information from a user equipment for which resources of a plurality of network side devices are aggregated; and a processor configured to perform scheduling according to the buffer state oration.

The user equipment for which resources of a plurality of network side devices are aggregated reports buffer state information to at least one of the network side devices participating in aggregation, so that a buffer state report can be made in the scenario of inter-eNB aggregation; and furthermore a plurality of eNBs in the case of inter-eNB aggregation can obtain the buffer state information and schedule the resources.

BRIEF DESCRIPTION OF THE DRAWINGS

FIG. 3 is a schematic structural diagram of a network side device in a system for reporting a buffer state according to an embodiment of the on;

DETAILED DESCRIPTION OF THE EMBODIMENTS

In embodiments of the invention, a user equipment, for which resources of a plurality of network side devices are aggregated, reports buffer state information to at least one of the network side devices participating in aggregation. The user equipment for which the resources of the plurality of network side devices are aggregated reports buffer state information to at least one of the network side devices participating in aggregation so that a buffer state report can be made in the scenario of inter-eNB aggregation.

The embodiments of the invention be described below in further details with reference to the drawings.

In the following description, firstly an implementation with cooperation of the network side and the user equipment side will be described, and then implementations at the network side and the user equipment side will be described respectively, but this doesn't suggest required cooperation of bath the sides for an implementation, and in fact, problems present respectively at the network side and the user equipment side may also be addressed in the separate implementations at the network side and the user equipment side, although a better technical effect can be achieved in the implementation with cooperation of both the sides.

Figure 1:
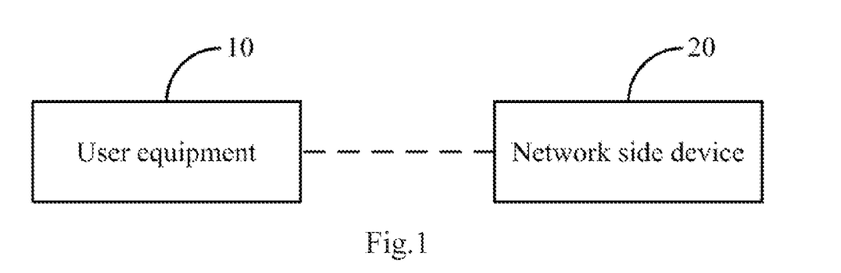
FIG. 1 is a schematic structural diagram of a system for reporting a buffer state according to an embodiment of the invention.

As illustrated in FIG. 1, a system for reporting a buffer state according to an embodiment of the invention includes a user equipment 10 and a network side device 20.

The user equipment 10 is configured to determine buffer state information and to report the buffer state information to at least one of the network side devices participating in aggregation, where resources of the plurality of network side devices are aggregated for the user equipment 10.

The network side devices 20 are configured to receive the buffer state information from the user equipment 10 and to perform scheduling according to the buffer state information.

Preferably the user equipment 10 makes a buffer state report at the granularity of an Logic Channel Group, LCG, or, an Radio Bearer, RB.

Particularly the report is made per LCG or RB dependent upon a required report granularity. If the report granularity is required to be precise, then the report can be made per RB; otherwise, the report can be made per LCG.

Particularly the content of the BSR information is the size of the amount of data in a huller corresponding to each LCG or RB. For example, if an RB is scheduled concurrently by two eNBs, then different BSR information can be reported to different eNBs so as to make more efficient use of the resources.

In an implementation, reference can be made to the 3GPP TS 36.321 protocol for scheduling by the network side device 20 according to the buffer state information, so a repeated description thereof may be omitted here.

In an implementation, the user equipment 10 can report the buffer state information to one of the network side devices participating in aggregation or can report the buffer state information to at least two of the network side devices participating in aggregation as described below respectively.

In a first case, the BSR triggering and reporting is performed per user equipment, in this case the network side devices participating in aggregation need to exchange the buffer state information with each other via internees between the network side devices.

Particularly the user equipment 10 reports the buffer state information to one of the network side devices participating in aggregation; and Correspondingly the network side device 20 receiving the buffer state information needs to transmit the buffer state information to the other network side devices.

Particularly a trigger mechanism and a report principle applied in the LTE R11 and earlier releases are applicable in the first case.

In an LTE system, parameters configured at the RRC layer for a BSR include the following two timers, both of which are configured and maintained per UE:

retxBSR-Timer which is a timer for prohibiting a BSR report; and periodicBSR-Timer which is a timer for a periodic BSR report.

A BSR and a trigger mechanism thereof are categorized as follows:

A regular BSR, which is triggered (1) when there is incoming data with a higher priority than the data in a current buffer or incoming data in an empty buffer; and (2) when the retxBSR-Timer expires and there is data in the buffer.

A periodic BSR, which is triggered when the periodicBSR.Timer expires.

A padding BSR, which can be triggered if there is a resource available (padding) in addition to data to be transmitted when the UE assembles a Medium Access Control Packet Data Unit, MAC PDU.

A BSR report principle is as follows:

For the regular BSR and the periodic BSR, if more than one Logical Channel Group, LCG; has data available, then a long BSR is reported; otherwise, a short BSR is reported; and For the padding BSR, if the number of padding bits is larger than or equal to a short BSR plus an MAC subheader but smaller than a long BSR plus an MAC subheader, and if more than one LCG of the UE has data available, then a truncated BSR is reported; otherwise, a short BSR is reported; and if the number of padding bits is larger than or equal to a long BSR plus an MAC subheader, then a long BSR is reported; and After the BSR is triggered, either of the periodic BSR or the padding BSR can be reported only if there is an uplink resource available, and if there is no uplink resource available for the regular BSR, then a Scheduling Request, SR, procedure may be triggered to request an eNB for allocating an uplink resource to the UE.

After the eNB allocates the uplink resource to the UE, if the resource is just sufficient to transmit all the uplink data, then no BSR may be transmitted but the uplink data may be transmitted directly; and if the resource is not sufficient to transmit all the uplink data, then the regular BSR or the periodic BSR is reported preferentially, and the eNB further performs subsequent transmission scheduling according to the amount of uplink data required for the UE reported in the BSR.

An MAC PDU includes at most one BSR. The order of BSR priorities is the regular BSR=the periodic BSR>the padding BSR, and if a plurality of BSRs are triggered concurrently, then the BSR with the highest priority is reported. Since the contents of the regular BSR and the periodic BSR are the same, where both of them include information about the amount of all the data available in the UE buffer, and the report formats of the regular BSR and the periodic BSR are totally the same, either of them can be selected to be reported. When the MAC layer assembles an MAC PDU, the MAC layer firstly places MAC Control Elements, CEs, of these two reports and then an MAC Service Data Unit, SDU.

The priority of the padding BSR is lower than data, and the padding BSR and the regular/periodic BSR can be reported in different MAC PDUs in the same sub-frame.

Particularly reference can be made to the 3GPP TS 36.321 protocol for a trigger mechanism and a report principle applied in the LTE R11 and earlier releases, so a repeated description thereof may be omitted here.

In an implementation, BSR related RRC-layer parameters configured by the eNB for the UE include a retxBSR-Timer and a periodicBSR-Timer. The eNB configuring the BSR related parameters can be a macro eNB or a local node participating in aggregation, e.g., any eNB for aggregation or an eNB responsible for mobility management or an eNB providing macro coverage or an eNB responsible for receiving a BSR or an eNB deciding whether bearer splitting is performed for an RB or an eNB responsible for scheduling.

Once a BSR is triggered, the user equipment 10 can report the buffer state information to one of the network side devices 20 participating in aggregation in one of the following approaches:

The user equipment 10 reports the buffer state information over an activated cell participating in aggregation and with an uplink resource; or The user equipment 10 reports the buffer state information over an activated cell, with an uplink resource, managed by a network side device responsible for scheduling; or The user equipment 10 reports the buffer state information over a cell, with an uplink resource, served by a network side device responsible for bearer splitting; or The user equipment 10 reports the buffer state information over a cell, with an uplink resource, of a network side device responsible for configuring buffer state report parameters.

In an implementation, if there is no uplink resource available (for example, there is no Physical Uplink Shared Channel, PUSCH) at present after the BSR is triggered, then the user equipment 10 transmits a Scheduling Request, SR, to the network side device to request the network side device for allocating an uplink resource for carrying the BSR; and then the user equipment 10 reports the buffer state information to at least one of the network side devices over the uplink resource allocated by the network side device. Preferably the user equipment 10 can transmit the SR to the network side device where an RB triggering the SR is located.

In an implementation, the network side device 20 receiving the buffer state information exchanges the buffer state information via, interfaces between the eNBs (e.g., X2 interfaces or other interfaces).

The network side device 20 receiving the buffer state information can further modify the contents of the buffer state information while exchanging the buffer state information with the other network side devices. The contents to be modified can be the buffer size and the number of logical channel groups (when a BSR is reported per LCG) or the number of Radio Bearers, RBs (when a BSR is reported per RB). Preferably the logical channel groups can be configured so that the network side can separate uplink buffers of RBs served by different eNBs from the BSR, for examples, RBs carried by different eNBs may not be allocated to the same logical channel group.

Particularly the network side device 20 receiving the buffer state information transmits the received buffer state information to the other network side devices; or The network side device 20 receiving the buffer state information modifies the buffer state information of a part of logical channel groups or the buffer state information of a part of RBs among the received buffer state information and transmits the modified buffer state information to the other network side devices; or The network side device 20 receiving the buffer state information transmits the buffer state information of logical channel groups, or buffer state information of the RBs, which are related to the other network side devices, among the received buffer state information to the corresponding network side devices; or The network side device 20 receiving the buffer state information modifies and then transmits the butler state information of logical channel groups, or buffer state information of the RBs, which are related to the other network side devices, among the received buffer state motion to the corresponding network side devices.

Particularly the other network side devices are network side devices receiving no buffer state information among the network side devices participating in aggregation, or network side devices receiving no buffer state information among the network side devices participating in aggregation and performing scheduling, or network side devices receiving no buffer state information among the network side devices participating in aggregation, performing scheduling and having a cell activated.

In a second case, the UE reports BSRs respectively to the plurality of network side devices participating aggregation without any interaction between the eNBs.

Particularly the second case further relates to two schemes.

In a first scheme, a trigger mechanism and a report principle applied in the LTE R11 and earlier releases are applicable. Reference can be made to the 3GPP TS 36.321 protocol for a trigger mechanism and a report principle applied in the LTE R11 and earlier releases, so a repeated description thereof may be omitted here.

Correspondingly once a BSR is triggered, the user equipment 10 determines BSR information to be reported to each network side device according to a relationship between an RB and a network device scheduling the RB, and report time for the different network side devices need to be the same. That is, the buffer state information of the user equipment 10 can be reported concurrently in the same sub-frame to the plurality of network side devices 20 participating in aggregation or participating in aggregation and performing scheduling.

In an implementation, the user equipment 10 determines the network side devices participating in aggregation according to a relationship between aggregated cells and the network side devices or a relationship between RBs and the network side devices.

Particularly the user equipment 10 can determine the network side devices participating in aggregation corresponding to the aggregated cells directly according to the relationship between the aggregated cells and the network side devices.

Preferably the network side devices transmit the relationship between the aggregated cells and the network side devices and/or the relationship between the RBs and the network side devices to the user equipment 10.

Particularly the network side devices can notify the user equipment 10 of the relationships above by Radio Resource Control, RRC, signaling.

In an implementation, buffer state information for the same logical channel group or buffer state information for the same RB among the buffer state information determined by the user equipment 10 to be reported to the different network side devices is the same or different. That is, buffer state information of the same logic channel group or RB reported by the user equipment 10 to the different network side devices 20 can be the same or different, for example, if a RB is scheduled concurrently by two eNBs, then buffer state information of the RB or buffer state information of an LCG, to which the RB belongs, reported to the different eNBs can be different; or Buffer state information determined by t le user equipment 10 to be reported to a different network side de rice includes only buffer state information corresponding to an RB served by the network side device or buffer state information of a logical channel group corresponding to the RB served by the network side device. That is, buffer state information, to be reported to each network side device participating in aggregation or participating in aggregation and performing scheduling, includes only buffer state information of an RB or a logical channel group to be scheduled by the network side device. For a network side device A, for example, then buffer state information transmitted by the user equipment to the network side device A includes only buffer state information of an RB or a logical channel group scheduled by the network side device A. If an RB is scheduled by a plurality of network side devices, then buffer state information of the RB or an LCG corresponding to the RB reported to the different network side devices can be the same or different.

Preferably the user equipment 10 determines an RB to be scheduled by each network side device 20 according to a relationship between the RB and the network side device.

In a second scheme, a trigger is made per eNB, that is, for each network side device performing scheduling, the UE judges whether there is a BSR triggered under the network side device for an RB or an LCG that can be scheduled by the network side device in accordance with a BSR trigger mechanism of the LTE R11 and earlier releases. In this scheme, a retxBSR-Timer and a periodicBSR-Timer are configured per UE and eNB and maintained per eNB.

Particularly buffer state information determined by the user equipment 10 to be reported to a different network side device includes only buffer state information corresponding to an RB served by the network side device or buffer state information of a logical channel group corresponding to the RB served by the network side device. That is, buffer state information, to be reported to each network side device participating in aggregation or participating in aggregation and performing scheduling, includes only buffer state information of an RB or a logical channel group to be scheduled by the network side device.

Once a BSR is triggered, the user equipment 10 only reports the buffer state information over an activated cell served by the network side device and with an uplink resource.

Preferably for a network side device, after the user equipment 10 reports the buffer state information to the network side device 20, and if truncated buffer state information is reported, then a periodic BSR timer (periodicBSR-Timer) and a BSR retransmission timer (retxBSR-Timer) corresponding to the network side device are started or restarted, and if non-truncated buffer state information reported, then the retxBSR-Timer corresponding to the network side device is started or restarted.

Preferably the user equipment reports the buffer state information to at least two of the network side devices:

If a user equipment 10 has one set of a periodicBSR-Timer and a retxBSR-Timer, then a network side device participating in aggregation or participating in aggregation and performing scheduling configures the user equipment 10 with a periodic BSR timer (periodicBSR-Timer) and a BSR retransmission timer (retxBSR-Timer);

If a user equipment 10 has a plurality of sets of periodicBSR-Timers and retxBSR-Timers, then each network side device participating in aggregation or participating in aggregation and performing scheduling configures the user equipment respectively with a periodic BSR timer (periodicBSR-Timer) and a BSR retransmission timer (retxBSR-Timer).

In the first scheme and the second scheme, in an implementation, if there is no uplink resource available at present after a BSR is triggered, the user equipment 10 transmits a Scheduling Request, SR, to the net cork side device to request the network side device for allocating an uplink resource; and then the user equipment 10 reports the buffer state information to at least one of the network side devices over the uplink resource allocated by the network side device. Preferably the user equipment 10 can transmit the SR to the network side device where an RB triggering the SR is located.

In the first scheme and the second scheme, when the user equipment 10 determines that a cell managed by the network side device 20, to which the buffer state information needs to be reported, has no uplink resource available, the user equipment 10 transmits the buffer state information to at least one of the other network side devices to instruct the other network side device to transmit the buffer state information to the corresponding network side device.

Particularly the network side device according to an embodiment of the invention can be a base station (e.g., a macro base station, a femtocell, etc.) or can be a Relay Node, RN, device or can be another network side device.

Figure 2:
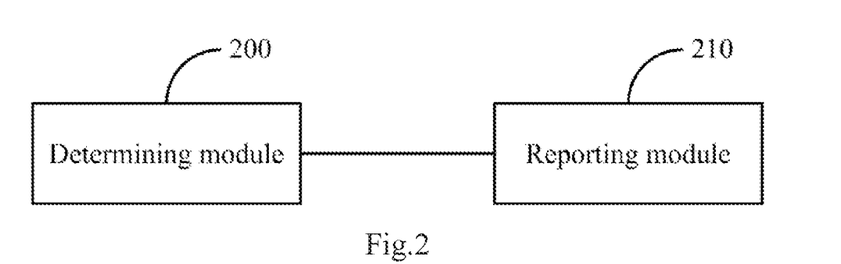
FIG. 2 is a schematic structural diagram of a user equipment in a system for reporting a buffer state according to an embodiment of the invention.

As illustrated in FIG. 2, a user equipment in a system for reporting a buffer state according to an embodiment of the invention includes a determining module 200 and a reporting module 210.

The determining module 200 is configured to determine buffer state information after resources of a plurality of network side devices are aggregated for the user equipment; and The reporting module 210 is configured to report the buffer state information to at least one of the network side devices participating in aggregation.

Preferably if the buffer state information is reported to one of the network side devices participating in aggregation, then the reporting module 210 reports the buffer state information over an activated cell participating in aggregation and with an uplink resource; or reports the buffer state information over an activated cell, with an uplink resource, managed by a network side device responsible for scheduling; or reports the buffer state information over a cell, with an uplink resource, served by a network side device responsible for bearer splitting; or reports the buffer state information over a cell, with an uplink resource, of a network side device responsible for configuring buffer state report parameters.

Preferably if the buffer state information is reported to at least of the network side devices, then the reporting module 210 reports the buffer state inform ion respectively to the network side devices participating in aggregation, or participating in aggregation and performing scheduling, or participating in aggregation, performing scheduling and having a cell activated, Wherein the user equipment reports the buffer state information to the different network side devices at the same or different time.

Preferably the reporting module 210 determines the network side devices participating in aggregation as follows:

The network side devices participating in aggregation are determined according to a relationship between aggregated cells and the network side devices or a relationship between Radio Bearers, RBs, and the network side devices.

Preferably buffer state information for the same logical channel group or buffer state information for the same RB among the buffer state information determined by the determining module 200 to be reported to the different network side devices is the same or different.

Preferably the determining module 200 determines an RB scheduled by a network side device as follows:

An RB scheduled by each network side device is determined according to a relationship between the RB and the network side device.

Preferably if the buffer state information is reported to at least two of the network side devices, then for a network side device, the reporting module 210 reports the buffer state information over an activated cell managed by the network side device and with an uplink resource.

Preferably buffer state information determined by the determining module 200 to be reported to a different network side device includes only buffer state information corresponding to an RB served by the network side device or buffer state information of a logical channel group corresponding to the RB served by the network side device.

Preferably if the buffer state information is reported to the at least two of the network side devices, for a network side device, after the reporting module 210 reports the buffer state information to the network side device, if truncated buffer state information is reported, then a periodicBSR-Timer and a retxBSR-Timer corresponding to the network side device are started or restarted, and if non-truncated buffer state information is reported, then the retxBSR-Timer corresponding to the network side device is started or restarted.

Preferably if the buffer state information is reported to at least two of the network side devices, after the reporting module 210 determines that a cell managed by the network side device, to which the buffer state information needs to be reported, has no uplink resource available, the reporting module 210 transmits the buffer state information to the other network side devices to instruct the other network side devices to transmit the buffer state information to the corresponding network side device. Correspondingly the network side device transmits buffer state information which is transmitted from the user equipment and should be reported to the other network side devices, to the corresponding network side devices upon reception of the buffer state information.

Preferably after the reporting module 210 determines that there is no uplink resource available at present, the reporting module 210 transmits a Scheduling Request, SR, to the network side device to request the network side device for allocating an uplink resource; and the reporting module 210 reports the buffer state information to at least one of the network side devices over the uplink resource allocated by the network side device.

Preferably the reporting module 210 transmits the SR to the network side device where an RB triggering the SR is located.

Particularly the determining module 200 can be a processor and the reporting module 210 can be a transmitting device.

Another user equipment according to an embodiment of the invention includes:

A processor, which is configured to determine buffer state information after resources of a plurality of network side devices are aggregated for the user equipment; and A transmitting device, which is configured to report the buffer state information to at least one of the network side devices participating in aggregation.

Preferably the transmitting device is particularly configured:

If the buffer state information is reported to one of the network side devices participating in aggregation, to report the buffer state information over an activated cell participating in aggregation and with an uplink resource; or to report the buffer state information over an activated cell, with an uplink resource, managed by a network side device responsible for scheduling; or to report the buffer state information over a cell, with an uplink resource, served by a network side device responsible for bearer splitting; or to report the buffer state information over a cell, with an uplink resource, of a network side device responsible for configuring buffer state report parameters.

Preferably the transmitting device is particularly configured:

If the buffer state information is reported to at least two of the network side devices, to report the buffer state information respectively to the network side devices participating in aggregation, or participating in aggregation and performing scheduling, or participating in aggregation, performing scheduling and having a cell activated, where the user equipment reports the buffer state information to the different network side devices at the same or different time.

Preferably the transmitting device determines the network side devices participating in aggregation according to a relationship between aggregated cells and the network side devices or a relationship between Radio Bearers, RBs, and the network side devices.

Preferably the processor is particularly configured:

To determine buffer state information for the same logical channel group or buffer state information for the same RB among the buffer state information to be reported to the different network side devices to be the same or different.

Preferably the processor determines an RB scheduled by each network side device according to a relationship between the RB and the network side device.

Preferably the transmitting device s particularly configured:

If the buffer state information is reported to at least two of the network side devices, then for a network side device, to report the buffer state information over an activated cell managed by the network side device and with an uplink resource.

Preferably the processor is particularly configured:

To determine that buffer state information reported to a different network side device includes only buffer state information corresponding to an RB served by the network side device or buffer state information of a logical channel group corresponding to the RB served by the network side device.

Preferably the transmitting device s further configured:

If the buffer state information is reported to the at least two of the network side devices, for a network side device, after reporting the buffer state information to the network side device if truncated buffer state information is reported, to start or restart a periodic BSR timer (periodicBSR-Timer) and a BSR retransmission timer (retxBSR-Timer) corresponding to the network side device, and if non-truncated buffer state information is reported, to start or restart the retxBSR-Timer corresponding to the network side device.

Preferably the transmitting device is further configured:

If the buffer state information is reported to at least two of the network side devices, after determining that a cell managed by the network side device, to which the buffer state information needs to be reported, has no uplink resource available, to transmit the buffer state information to the other network side devices to instruct the other network side devices to transmit the buffer state information to the corresponding network side device.

Preferably the transmitting device is further configured:

After determining that there is no uplink resource available at present, to transmit a Scheduling Request, SR, to the network side device to request the network side device for allocating an uplink resource; and to report the buffer state information to at least one of the network side devices over the uplink resource allocated by the network side device.

Preferably the transmitting device is particularly configured:

To transmit the SR to the network side device where an RB triggering the SR is located.

Figure 3:
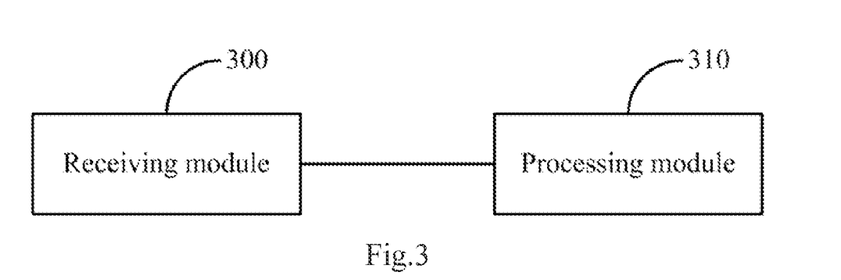

As illustrated in FIG. 3, a network side device in a system for reporting a buffer state according to an embodiment of the invention includes a receiving module 300 and a processing module 310.

The receiving module 300 is configured to receive buffer state information from a user equipment for which resources of a plurality of network side devices are aggregated; and The processing module 310 is configured to perform scheduling according to the buffer state information.

Preferably if the user equipment reports the buffer state information to one of the network side devices, then upon reception of the buffer state information from the user equipment for which the resources of the plurality of network side devices are aggregated, the processing module 310 transmits the received buffer state information to the other network side devices; or modifies the buffer state information of a part of logical channel groups or the buffer state information of a part of RBs among the received buffer state information and transmits the modified buffer state information to the other network side devices; or transmits the buffer state information of logical channel groups, or buffer state information of the RBs, which are related to the other network side devices, among the received buffer state information to the corresponding network side devices; or modifies and then transmits the buffer state information of logical channel groups, or buffer state information of the RBs, which are related to the other network side devices, among the received buffer state information to the corresponding network side devices.

Preferably the other network side devices are network side devices receiving, no buffer state information among the network side devices participating in aggregation, or network side devices receiving no buffer state information among the network side devices participating in aggregation and performing scheduling, or network side devices receiving no buffer state information among the network side devices participating in aggregation, performing scheduling and having a cell activated.

Preferably if the user equipment reports the buffer state information to at least two of the network side devices, then the processing module 310 transmits a relationship between aggregated cells and the network side devices and/or a relationship between RBs and the network side devices to the user equipment.

Preferably the user equipment reports the buffer state information to at least two of the network side devices:

If a user equipment has one set of a periodicBSR-Timer and a retxBSR-Timer, then the processing module 310 configures the user equipment with a periodicBSR-Timer and a retxBSR-Timer upon determining that this configuration is required for the user equipment; or if a user equipment has a plurality of sets of periodicBSR-Timers and retxBSR-Timers, then the processing module 310 configures the user equipment with one of the sets of periodicBSR-Timers and retxBSR-Timers.

Based upon the same inventive idea, embodiments of the invention further provide a method of making a buffer state report by a user equipment and a method of processing a buffer state report by a network side device, and since these methods address the problem under a principle similar to that of the system for reporting a buffer state according to the embodiment of the invention, reference can be made to an implementation of the system for implementations of these methods, so a repeated description thereof will be omitted here.

Particularly the receiving module can be a receiver, and the processing module can be a processor.

Another network side device according to an embodiment of the invention includes:

A receiver is configured to receive buffer state information from a user equipment for which resources of a plurality of network side devices are aggregated; and A processor is configured to perform scheduling according to the buffer state information.

Preferably when the user equipment reports the buffer state information to one of the network side devices, the processor is further configured:

Upon reception of the buffer state information from the user equipment for which the resources of the plurality of network side devices are aggregated, to transmit the received buffer state information to the other network side devices; or to modify the buffer state information of a part of logical channel groups or the buffer state information of a part of RBs among the received buffer state information and to transmit the modified buffer state information to the other network side devices; or to transmit the buffer state information of logical channel groups, or buffer state information of the RBs, which are related to the other network side devices, among the received buffer state information to the corresponding network side devices; or to modify and then transmit the buffer state information of logical channel groups, or buffer state information of the RBs, which are related to the other network side devices, among the received buffer state information to the corresponding network side devices.

When the user equipment reports the buffer state information to at least two of the network side devices, the processor is further configured:

To transmit a relationship between aggregated cells and the network side devices and/or a relationship between RBs and the network side devices to the user equipment.

When the user equipment reports the buffer state information to at least two of the network side devices, the processor is further configured:

If a user equipment has one set of a periodicBSR-Timer and a retxBSR-Timer, to configure the user equipment with a periodicBSR-Timer and a retxBSR-Timer upon determining that this configuration is required for the user equipment;

If a user equipment has a plurality of sets of periodicBSR-Timer and retxBSR-Timers, configure the user equipment with one of the sets of periodicBSR-Timers and retxBSR-Timers.

Figure 4:
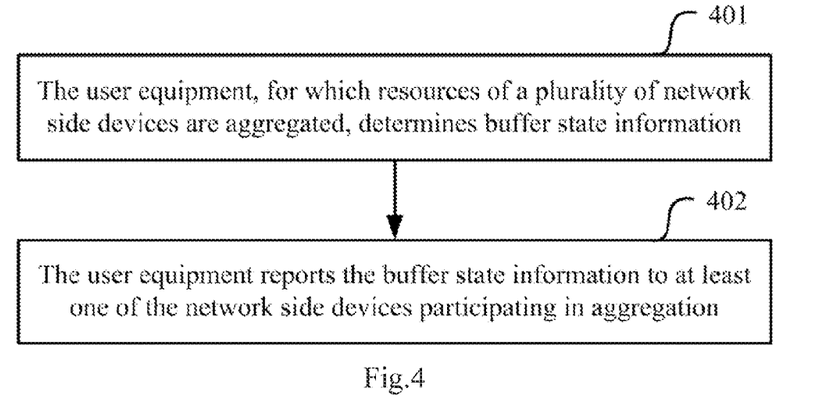
FIG. 4 is a schematic flow chart of a method of making a buffer state report by a user equipment according to an embodiment of the invention.

As illustrated in FIG. 4, a method of making a buffer state report by a user equipment according to an embodiment of the invention includes the following operations:

The operation 401: the user equipment, for which resources of a plurality of network side devices are aggregated, determines buffer state information; and The operation 402: the user equipment reports the buffer state information to at least one of the network side devices participating in aggregation.

Preferably the user equipment makes a buffer state report at the granularity of an LCG or an RB.

In an implementation, the user equipment can report the buffer state information to one of the network side devices participating in aggregation or can report the buffer state information to at least two of the network side devices participating in aggregation as described below respectively.

In a first case, the BSR triggering and reporting is performed per user equipment, in this case, the network side devices participating in aggregation need to exchange the buffer state information with each other via interfaces between the network side devices.

Particularly the user equipment reports the buffer state information to one of the network side devices participating in aggregation.

Particularly a trigger mechanism and a report principle applied in the LTE R11 and earlier releases are applicable in the first case, and reference can be made to the 3GPP TS 36.321 protocol for details thereof, so a repeated description thereof may be omitted here.

Once a BSR is triggered, the user equipment can report the buffer state information to one of the network side devices participating in aggregation in one of the following approaches:

The user equipment reports the buffer state information over an activated cell participating in aggregation and with an uplink resource; or The user equipment reports the buffer state information over an activated cell, with an uplink resource, managed by a network side device responsible for scheduling; or The user equipment reports the buffer state information over a cell, with an uplink resource, served by a network side device responsible for bearer splitting; or The user equipment reports the buffer state information over a cell, with an uplink resource, of a network side device responsible for configuring buffer state report parameters.

In an implementation, if there is no uplink resource available at present after the BSR is triggered, then the user equipment transmits an SR to the network side device to request the network side device for allocating an uplink resource for carrying the BSR; and then the user equipment reports the buffer state information to at least one of the network side devices over the uplink resource allocated by the network side device. Preferably the user equipment can transmit the SR to the network side device where an RB triggering the SR is located.

In a second case, the UE reports BSRs respectively to the plurality of network side devices participating in aggregation without any interaction between the eNBs.

Particularly the second case further relates to two schemes.

In a first scheme, a trigger mechanism and a report principle applied in the LTE R11 and earlier releases are applicable. Reference can be made to the 3GPP TS36.321 protocol for a trigger mechanism and a report principle applied in the LTE R11 and earlier releases, so a repeated description thereof may be omitted here.

Correspondingly once a BSR is triggered, the user equipment reports the buffer state information respectively to the network side devices participating in aggregation, or participating in aggregation and performing scheduling, or participating in aggregation, performing scheduling and having a cell activated, wherein the user equipment reports the buffer state information to the different network side devices at the same or different time. That is, the buffer state information of the user equipment can be reported concurrently in the same sub-frame to the plurality of network side devices participating in aggregation or participating in aggregation and performing scheduling.

In an implementation, the user equipment determines the network side devices participating in aggregation according to a relationship between aggregated cells and the network side devices or a relationship between RBs and the network side devices.

Particularly the user equipment can determine the network side devices participating in aggregation corresponding to the aggregated cells directly according to the relationship between the aggregated cells and the network side devices.

Particularly the relationship between the aggregated cells and the network side devices and/or the relationship between the RBs and the network side devices can be specified in the protocol or can be notified of by the network side.

In an implementation, buffer state information for the same logical channel group or buffer state information for the same RB among the buffer state information determined by the user equipment to be reported to the different network side devices is the same or different; or Buffer state information determined by the user equipment to be reported to a different network side device includes only buffer state information corresponding to an RB served by the network side device or buffer state information of a logical channel group corresponding to the RB served by the network side device.

Preferably the user equipment determines an RB to be scheduled by each network side device according to a relationship between the RB and the network side device.

In a second scheme, a trigger is made per eNB, that is, for each network side device performing scheduling, the UE judges whether there is a BSR triggered under the network side device for an RB or an LCG that can be scheduled by the network side device in accordance with a BSR trigger mechanism of the LTE R11 and earlier releases. In this scheme, a retxBSR-Timer and a periodicBSR-Timer are configured per UE and eNB and maintained per eNB.

Particularly buffer state information determined by the user equipment to be reported to a different network side device includes only buffer state information corresponding to an RB served by the network side device or buffer state information of a logical channel group corresponding to the RB served by the network side device.

Once a BSR is triggered, the user equipment only reports the buffer state information over an activated cell served by the network side device and with an uplink resource.

Preferably for a network side device, after the user equipment reports the buffer state information to the network side device, if truncated buffer state information is reported, then a periodicBSR-Timer and a retxBSR-Timer corresponding to the network side device are started or restarted, and if non-truncated buffer state information is reported, then the retxBSR-Timer corresponding to the network side device is started or restarted.

In the first scheme and the second scheme, in an implementation, if there is no uplink resource available at present after a BSR is triggered, the user equipment transmits an SR to the network side device to request the network side device for allocating an uplink resource; and then the user equipment reports the buffer state information to at east one of the network side devices over the uplink resource allocated by the network side device. Preferably the user equipment can transmit the SR to the network side device where an RB triggering the SR is located.

In the first scheme and the second scheme, when the user equipment determines that a cell managed by the network side device, to which the buffer state information needs to be reported, has no uplink resource available, the user equipment transmits the buffer state information to at least one of the other network side devices to instruct the other network side device to transmit the buffer state information to the corresponding network side device.

Figure 5:
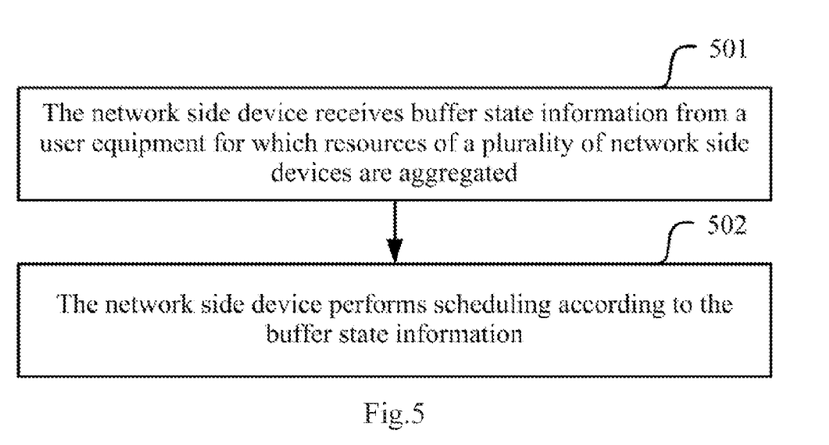
FIG. 5 is a schematic flow chart of a method of processing a butler state report by a network side device according to an embodiment of the invention.

As illustrated in FIG. 5, a method of processing a buffer state report by a network side device according to an embodiment of the invention includes the following operations:

Operation 501, the network side device receives buffer state information from a user equipment for which resources of a plurality of network side devices are aggregated; and Operation 502, the network side device performs scheduling according to the buffer state information.

In an implementation, the user equipment can report the buffer state information to one of the network side devices participating in aggregation or can report the buffer state information to at least two of the network side devices participating in aggregation as described below respectively.

In a first case, the SSR triggering and reporting is performed per user equipment, in this case, the network side devices participating in aggregation need to exchange the buffer state information with each other via interfaces between the network side devices.

Particularly the network side device receiving the buffer state information needs to transmit the buffer state information to the other network side devices.

In an implementation, BSR related RRC-layer parameters configured by the eNB for the UE include a retxBSR-Timer and a periodicBSR-Timer. The eNB configuring the BSR related parameters can be a macro eNB or a local node participating in aggregation, e.g., any eNB for aggregation or an eNB responsible for mobility management or an eNB providing macro coverage or an eNB responsible for receiving BSR or an eNB deciding whether bearer splitting is performed for an RB or an eNB responsible for scheduling.

In an implementation, the network side device receiving the buffer state information exchanges the buffer state information via interfaces between the eNBs (e.g., X2 interfaces or other interfaces).

The network side device receiving the buffer state information can further modify the contents of the buffer state information while exchanging the buffer state information with the other network side devices. The contents to be modified can be the buffer size and the number of logical channel groups (when a BSR is reported per LCG) or the number of Radio Bearers, RBs (when a BSR is reported per RB). Preferably the logical channel groups can be configured so that the network side can separate uplink buffers of RBs served by different eNBs from the BSR, for examples, RBs carried by different eNBs may not be allocated to the same logical channel group.

Particularly the network side device receiving the buffer state inform ion transmits the received buffer state information to the other network side devices; or The network side device receiving the buffer state information modifies the buffer state information of a part of logical channel groups or the buffer state information of a part of RBs among the received buffer state information and transmits the modified buffer state information to the other network side devices; or The network side device receiving the buffer state information transmits the buffer state information of logical channel groups, or buffer state information of the RBs, which are related to the other network side devices, among the received buffer state information to the corresponding network side devices; or The network side device receiving the buffer state information modifies and then transmits the buffer state information of logical channel groups, or buffer state information of the RBs, which are related to the other network side devices, among the received buffer state information to the corresponding network side devices.

Particularly the other network side devices are network side devices receiving no buffer state information among the network side devices participating in aggregation, or network side devices receiving no buffer state information among the network side devices participating in aggregation and performing scheduling, or network side devices receiving no buffer state information among the network side devices participating in aggregation, performing scheduling and having a cell activated.

In a second case, the UE reports BSRs respectively to the plurality of network side devices participating in aggregation without any interaction between the eNBs.

In the second case, the network side device transmits buffer state information, which is transmitted form the user equipment and should be reported to the other network side devices, to the corresponding network side devices upon reception of the buffer state information.

Preferably the network side device transmits a relationship between aggregated cells and the network side devices and/or a relationship between RBs and the network side devices to the user equipment.

Particularly the network side device can notify the user equipment of the relationships above by RRC signaling.

Preferably the user equipment reports the buffer state information to at least two of the network side devices:

If a user equipment has one set of a periodicBSR-Timer and a retxBSR-Timer, then a network side device participating in aggregation or participating in aggregation and performing scheduling configures the user equipment with a periodicBSR-Timer and a retxBSR-Timer;

If a user equipment has a plurality of sets of periodicBSR-Timers and retxBSR-Timers, then each network side device participating in aggregation or participating in aggregation and performing scheduling configures the user equipment respectively with a periodicBSR-Timer and a retxBSR-Timer.

Particularly FIG. 4 and FIG. 5 can be combined into a flow of a method of making buffer state report, that is, firstly the operation 401 and the operation 402 and then the operation 501 and the operation 502 are performed.

The first case above may be described below in details by way of an example.

Operation 1: configure BSR parameters:

The eNB configures BSR related RRC-layer parameters for the UE, the parameters include a retxBSR-Timer and a periodicBSR-Timer. The eNB configuring the BSR related parameters can be a macro eNB or a local node participating in aggregation.

Operation 2: trigger a BSR:

A BSR trigger type and a trigger scheme can be performed in accordance with a BSR trigger mechanism in the releases earlier than the R12, and reference can be made to the Background. If a BSR is triggered and there is no UL resource available, then an SR is triggered, and an SR resource is configured per UE.

Operation 3: report the BSR:

A BSR reporting principle can follow a BSR reporting principle releases earlier than the R12, and reference can be made to the Background. A BSR report resource can be selected in the following options:

The BSR is reported to the eNB over any one activated cell uplink resource; or

The BSR is reported to the eNB over a cell served by an eNB responsible for bearer splitting; or The BSR is reported to the eNB over a cell managed by an eNB responsible for configuring BSR parameters.

The BSR is reported to the eNB over a cell managed aged by an eNB responsible for scheduling.

Operation 4: process the reported BSR:

Once a BSR of the UE is triggered and can be reported, a periodicBSR-Timer and a retxBSR-Timer are started or restarted. It shall be noted that if only a truncated BSR is reported, then the periodicBSR-Timer can not be started/restarted while only the retxBSR-Timer can be started or restarted.

Operation 5: exchange BSR information between eNBs;

If only one of the different eNBs participating in aggregation is responsible for scheduling, then the eNB can simply schedule resources of the plurality of eNBs participating in aggregation according to the BSR information. If a plurality of eNBs among the different eNBs participating in aggregation need to perform scheduling, then the eNB obtaining the BSR information needs to forward the BSR information to the relevant eNBs via interfaces between the eNBs (e.g., X2 interfaces), possibly in the following several forwarding schemes:

The eNB forwards all the received BSR information to the other eNBs, and furthermore the eNB is allowed to modify buffer information of a part of RBs or logical channel groups among the BSR information, that is, if an RB is scheduled concurrently by two eNBs, then the eNB, which forwards the BSR, can modify buffer information of a corresponding RB or LCG according to its resource condition; and The eNB forwards only buffer state information of an RB or a logical channel group, which is related to some eNB, to a corresponding eNB, and furthermore the UE is allowed to modify buffer information of a part of RBs or logical channel groups among the BSR information, that is, if an RB is scheduled concurrently by two eNBs, then the eNB, which forwards the BSR, can modify buffer information of a corresponding RB or LCG according to its resource condition.

The second case above may be described below in details by way of three examples.

In a first example, a report is triggered per UE but reported respectively to eNBs participating in aggregation and performing scheduling, wherein the reported buffer information is BSR information per UE, although buffer contents corresponding to respective RBs or LCGs may be allowed to be different.

Operation 1: obtain configuration information;

The UE obtains the following configuration information:

The UE needs to obtain a relationship between aggregated cells and eNBs by RRC signaling;

The UE needs to obtain a relationship between RBs and transmitting eNBs by RRC signaling; and The UE obtains the configuration of a retxBSR-Timer and a periodicBSR-Timer by RRC signaling. The eNB configuring the BSR related parameters can be a macro eNB or a local node participating in aggregation.

The configuration information can be transmitted by any eNB participating in aggregation or an eNB responsible for mobility management or an eNB providing macro coverage or an eNB responsible for receiving a BSR or an eNB deciding whether bearer splitting is performed for an RB or an eNB responsible for scheduling.

Operation 2: trigger a BSR:

A BSR trigger type and a trigger scheme can be embodied in accordance with a BSR trigger mechanism in the releases earlier than the R12, and reference can be made to the Background. If a BSR is triggered and there is no UL resource available, then an SR is triggered, and an SR resource is configured per UE.

Operation 3: report the BSR;

A BSR reporting principle differs from a BSR reporting principle in the releases earlier than the R12 in that:

There are a plurality of MAC PDUs carrying regular BSRs and periodic BSRs in a Transmission Time Interval, TTI (there is only one MAC PDU carrying a regular/periodic BSR in a TTI in the releases earlier than the R12).

For the same RB or LCG, the buffer size carried in each BSR can be the same or can be different (it is required to be the same in the releases earlier than the R12).

A BSR report resource can be selected in the following options:

The UE at least needs to transmit BSR information per that UE to each eNB participating in aggregation and performing scheduling. Buffer information of each RB or LCG transmitted to the different eNBs can be different or can be the same. In this solution, it is required that the eNB receiving an SR needs to coordinate the other scheduling eNBs to allocate BSR resources concurrently for the UE.

Operation 4: process the reported BSR.

Once a BSR of the UE is triggered and can be reported, a periodicBSR-Timer and a retxBSR-Timer are started or restarted. It shall be noted that if only a truncated BSR is reported, then the periodicBSR-Timer can not be started/restarted while only the retxBSR-Timer can be started or restarted.

In a second example, a report is triggered per UE but reported respectively to eNBs participating in aggregation and performing scheduling, and the information reported to each eNB includes only BSR information of an RB or an LCG scheduled by the eNB.

Operation 1: obtain configuration information;

The UE obtains the following configuration information:

The UE needs to obtain a relationship between aggregated cells and eNBs by RRC signaling;

The UE needs to obtain a relationship between RBs and transmitting eNBs by RRC signaling; and The UE obtains the configuration of a retxBSR-Timer and a periodicBSR-Timer by RRC signaling. The eNB configuring the BSR related parameters can be a macro eNB or a local node participating in aggregation.

The configuration information can be transmitted by any eNB participating in aggregation or an eNB responsible for mobility management or an eNB providing macro coverage or an eNB responsible for receiving a BSR or an eNB deciding whether bearer splitting is performed for an RB or an eNB responsible for scheduling.

Operation 2: trigger a BSR;

A BSR trigger type and a trigger scheme can be embodied in accordance with a BSR trigger mechanism in the releases earlier than the R12, and reference can be made to the Background. If a BSR is triggered and there is no UL resource available, then an SR is triggered, and an SR resource is configured per UE.

Operation 3: report the BSR;

A BSR reporting principle differs from a BSR reporting principle in the releases earlier than the R12 in that:

There are a plurality of MAC PDUs carrying regular BSRs and periodic BSRs in a TTI (there is only one MAC PDI carrying a regular/periodic BSR in a TTI in the releases earlier than the R12).

The UE needs to assemble BSR MAC CEs respectively for different eNBs participating in aggregation, or participating in aggregation and performing scheduling, and each BSR MAC CE includes only information of an RB or an LCG related to the eNB. If a plurality of BSR MAC CEs include buffer information of the same RB or LCG, then buffer states in the different BSR MAC CEs can take different values.

A BSR report resource can be selected in the following options:

The UE reporting BSR information corresponding to each eNB participating in aggregation or participating in aggregation and performing scheduling needs to select an uplink resource allocated over an activated cell served by the eNB. Even if there is no UL grant for the cell served by the eNB, the BSR. MAC CE is allowed to be forwarded by another eNB and an eNB indicator needs to be added to the BSR MAC CE so that a receiving eNB can determine to which eNB the received BSR MAC CE may be forwarded via interfaces between the eNBs.

Operation 4: process the reported BSR;

Once a BSR of the UE is triggered and can be reported, a periodicBSR-Timer and a retxBSR-Timer are started or restarted. It shall be noted that if only a truncated BSR is reported, Then the periodicBSR-Timer can not be started/restarted while only the retxBSR-Timer can he started or restarted.

In a third example, a BSR is triggered and reported per eNB.

Operation 1: obtain configuration information;

The UE obtains the following configuration information:

The UE needs to obtain a relationship between aggregated cells and eNBs by RRC signaling; and The UE needs to obtain a relationship between RBs and transmitting eNBs by RRC signaling.

Each eNB participating in aggregation or participating in aggregation and performing scheduling configures the UE with a retxBSR-Timer and a periodicBSR-Timer corresponding to the eNB respectively by RRC signaling.

The first two pieces of configuration information can be transmitted by any eNB participating in aggregation or an eNB responsible for mobility management or an eNB providing macro coverage or an eNB responsible for receiving a BSR or an eNB deciding Whether bearer splitting is performed for an RB or an eNB responsible for scheduling. If an eNB transmits a retxBSR-Timer and a periodicBSR-Timer of another eNB, then related eNB identification information needs to be carried.

Operation 2: trigger a BSR:

Whether there is a BSR triggered is judged for an RB served by each eNB respectively in accordance with a BSR trigger type and a trigger scheme in the releases earlier than the R12 as follows:

A regular BSR is triggered if either of the following two conditions is satisfied for the RB scheduled by the eNB: (1) when there is incoming data with a higher priority than the data in a current buffer or incoming data in an empty buffer; and (2) when the retxBSR-Timer expires and there is data in the buffer.

A periodic BSR is triggered when the periodicBSR-Timer corresponding to the eNB expires.

A padding BSR can be triggered if there is a resource available (padding) in addition to a resource for data to be transmitted in the resources allocated by the eNB when the UE assembles an MAC PDU.

Operation 3: report the BSR:

If there is a BSR to be reported but no UL resource available, then the UE needs to trigger an SR for the eNB to request the corresponding eNB for allocating an UL resource thereto.

The UE reports a BSR for each eNB for which a BSR is required respectively in accordance with a BSR report mechanism in the releases earlier than the R12. It shall be noted that if a plurality of eNBs require information of an RB or a logical channel group to be reported, then different contents are allowed to be reported to the different eNBs. The BSR can be reported over an activated cell served by the eNB and with an uplink available resource.

Operation 4: process the reported BSR;

For some eNB, if the UE reports a BSR to the eNB, then a periodicBSR-Timer and a. retxBSR-Timer configured by the eNB are started or restarted. It shall be noted that if only a truncated BSR is reported, then the periodicBSR-Timer can not be started/restarted while only the retxBSR-Timer can be started or restarted, There is no influence upon periodicBSR-Timers and retxBSR-Timers configured by the other eNBs.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of reporting a buffer state, wherein the method comprises:
   determining, by a user equipment for which resources of a plurality of network side devices are aggregated, buffer state information; and
   reporting, by the user equipment, the buffer state information to at least one of the network side devices participating in aggregation;
   wherein the user equipment reports the buffer state information to at least two of the network side devices, and the step of reporting comprises: for one of the at least two network side devices, reporting, by the user equipment, the buffer state information over an activated cell managed by the network side device and with an uplink resource; and
   after the user equipment reports the buffer state information to the at least two of the network side devices, the method further comprises:
   for one of the at least two network side devices, after the user equipment reports the buffer state information to the network side device, if truncated buffer state information is reported, then a BSR retransmission timer, retxBSR-Timer, corresponding to the network side device is started or restarted, and if non-truncated buffer state information is reported, then a periodic BSR timer, periodicBSR-Timer, and the retxBSR-Timer corresponding to the network side device are started or restarted.

2. The method according to claim 1, wherein the user equipment reports the buffer state information to one of the network side devices participating in aggregation, the step of reporting comprises:
   reporting, by the user equipment, the buffer state information over an activated cell participating in aggregation and with an uplink resource; or
   reporting, by the user equipment, the buffer state information over an activated cell, with an uplink resource, managed by a network side device responsible for scheduling; or
   reporting, by the user equipment, the buffer state information over a cell, with an uplink resource, served by a network side device responsible for bearer splitting; or
   reporting, by the user equipment, the buffer state information over a cell, with an uplink resource, of a network side device responsible for configuring buffer state report parameters.

3. The method according to claim 1, wherein the user equipment reports the buffer state information to at least two of the network side devices, the step of reporting comprises:
   reporting, by the user equipment, the buffer state information respectively to the network side devices participating in aggregation, or participating in aggregation and performing scheduling, or participating in aggregation, performing scheduling and having a cell activated, wherein the user equipment reporting the buffer state information to the different network side devices at the same or different time.

4. The method according to claim 3, wherein the user equipment determines the network side devices participating in aggregation by:
   the user equipment determining the network side devices participating in aggregation according to a relationship between aggregated cells and the network side devices, or a relationship between Radio Bearers, RBs, and the network side devices.

5. The method according to claim 3, wherein reporting, by the user equipment, the buffer state information to at least two of the network side devices comprises:
   after the user equipment determines that a cell managed by the network side device, to which the buffer state information needs to be reported, has no uplink resource available, transmitting, by the user equipment, the buffer state information to the other network side devices to instruct the other network side devices to transmit the buffer state information to the corresponding network side device.

6. The method according to claim 1, wherein before the user equipment reports the buffer state information to at least one of the network side devices, the method further comprises:
after the user equipment determines that there is no uplink resource available at present, transmitting, by the user equipment, a Scheduling Request, SR, to the network side device to request the network side device for allocating an uplink resource; and
reporting, by the user equipment, the buffer state information to at least one of the network side devices comprises:
reporting, by the user equipment, the buffer state information to at least one of the network side devices over the uplink resource allocated by the network side device.

7. The method according to claim 1, wherein the user equipment reports the buffer state at the granularity of a Logical Channel Group, LCG, or an RB.

8. A method of reporting a buffer state, wherein the method comprises:
receiving, by a network side device, buffer state information from a user equipment for which resources of a plurality of network side devices are aggregated; and
performing, by the network side device, scheduling according to the buffer state information;
wherein the user equipment reports the buffer state information to at least two of the network side devices; and
before the network side device receives the buffer state information from the user equipment, the method further comprises:
if a user equipment has one set of a periodicBSR-Timer and a retxBSR-Timer, then configuring, by a network side device participating in aggregation or participating in aggregation and performing scheduling, the user equipment with a periodicBSR-Timer and a retxBSR-Timer; or if a user equipment has a plurality of sets of periodicBSR-Timers and retxBSR-Timers, then configuring, by each network side device participating in aggregation or participating in aggregation and performing scheduling, the user equipment respectively with a periodicBSR-Timer and a retxBSR-Timer.

9. The method according to claim 8, wherein the user equipment reports the buffer state information to one of the network side devices; and
after the network side device receives the buffer state information from the user equipment, the method further comprises:
transmitting, by the network side device, the received buffer state information to the other network side devices; or
modifying, by the network side device, the buffer state information of a part of logical channel groups or the buffer state information of a part of RBs among the received buffer state information and transmitting the modified buffer state information to the other network side devices; or
transmitting, by the network side device, the buffer state information of logical channel groups, or buffer state information of the RBs, related to the other network side devices among the received buffer state information to the corresponding network side devices; or
modifying and then transmitting, by the network side device, the buffer state information of logical channel groups, or buffer state information of the RBs, related to the other network side devices among the received buffer state information to the corresponding network side devices.

10. The method according to claim 9, wherein the other network side devices are network side devices receiving no buffer state information among the network side devices participating in aggregation, or network side devices receiving no buffer state information among the network side devices participating in aggregation and performing scheduling, or network side devices receiving no buffer state information among the network side devices participating in aggregation, performing scheduling and having a cell activated.

11. The method according to claim 8, wherein the user equipment reports the buffer state information to at least two of the network side devices; and
before the network side device receives the buffer state information from the user equipment, the method further comprises:
transmitting, by the network side device, a relationship between aggregated cells and the network side devices to the user equipment; or
transmitting, by the network side device, a relationship between RBs and the network side devices to the user equipment; or
transmitting, by the network side device, the relationship between aggregated cells and the network side devices, and the relationship between RBs and the network side devices to the user equipment.

12. A user equipment, wherein the user equipment comprises:
a processor configured to determine buffer state information after resources of a plurality of network side devices are aggregated for the user equipment; and
a transmitting device configured to report the buffer state information to at least one of the network side devices participating in aggregation;
wherein the transmitting device is configured:
when the buffer state information is reported to at least two of the network side devices, then for a network side device, to report the buffer state information over an activated cell managed by the network side device and with an uplink resource; and
the transmitting device is further configured:
if the buffer state information is reported to the at least two of the network side devices, for a network side device, after reporting the buffer state information to the network side device, if truncated buffer state information is reported, to start or restart a BSR retransmission timer, retxBSR-Timer, corresponding to the network side device, and if non-truncated buffer state information is reported, to start or restart a periodic BSR timer, periodicBSR-Timer, and the retxBSR-Timer corresponding to the network side device.

13. The user equipment according to claim 12, wherein the transmitting device is configured:
if the buffer state information is reported to one of the network side devices participating in aggregation, to report the buffer state information over an activated cell participating in aggregation and with an uplink resource; or to report the buffer state information over an activated cell, with an uplink resource, managed by a network side device responsible for scheduling; or to report the buffer state information over a cell, with an uplink resource, served by a network side device responsible for bearer splitting; or to report the buffer state information over a cell, with an uplink resource, of a network side device responsible for configuring buffer state report parameters.

14. The user equipment according to claim 12, wherein the transmitting device is configured:
if the buffer state information is reported to at least two of the network side devices, to report the buffer state information respectively to the network side devices participating in aggregation, or participating in aggregation and performing scheduling, or participating in aggregation, performing scheduling and having a cell activated, wherein the user equipment reports the buffer state information to the different network side devices at the same or different time.

15. The user equipment according to claim 14, wherein the transmitting device determines the network side devices participating in aggregation according to a relationship between aggregated cells and the network side devices, or a relationship between Radio Bearers, RBs, and the network side devices.

16. The user equipment according to claim 14, wherein the transmitting device is further configured:
if the buffer state information is reported to at least two of the network side devices, after determining that a cell managed by the network side device to which the buffer state information needs to be reported has no uplink resource available, to transmit the buffer state information to the other network side devices to instruct the other network side devices to transmit the buffer state information to the corresponding network side device.

17. The user equipment according to claim 14, wherein the transmitting device is further configured:
after determining that there is no uplink resource available at present, to transmit a Scheduling Request, SR, to the network side device to request the network side device for allocating an uplink resource; and to report the buffer state information to at least one of the network side devices over the uplink resource allocated by the network side device.

* * * * *